(12) United States Patent
James

(10) Patent No.: US 6,315,487 B1
(45) Date of Patent: Nov. 13, 2001

(54) FORCE-TRANSMITTING DEVICE

(75) Inventor: Rick James, Spokane, WA (US)

(73) Assignee: Spur Industries Inc., Spokane, WA (US)

( * ) Notice: Subject to any disclaimer, the term of this patent is extended or adjusted under 35 U.S.C. 154(b) by 0 days.

(21) Appl. No.: 09/454,486

(22) Filed: Dec. 3, 1999

(51) Int. Cl.[7] .................................................. F16L 13/00
(52) U.S. Cl. ........................ 403/270; 403/282; 464/182
(58) Field of Search ..................................... 464/179, 182, 464/902; 228/158, 173.4, 173.5, 175; 403/270, 271, 274, 282, 335, 336

(56) References Cited

U.S. PATENT DOCUMENTS

| | | | | |
|---|---|---|---|---|
| 2,370,641 | * | 3/1945 | Dewey | 228/173 A X |
| 2,539,248 | * | 1/1951 | Lynch et al. | 228/158 |
| 2,769,231 | * | 11/1956 | Grenell | 228/175 |
| 5,064,112 | * | 11/1991 | Isobe et al. | 228/175 X |
| 5,088,638 | * | 2/1992 | Karaev et al. | 228/173.5 |
| 5,365,664 | * | 11/1994 | Whitney, Jr. | |
| 5,658,307 | * | 11/1997 | Exconde | |
| 6,036,077 | * | 3/2000 | Kingston | 403/270 X |

\* cited by examiner

*Primary Examiner*—Lynne H. Browne
*Assistant Examiner*—Greg Binda
(74) *Attorney, Agent, or Firm*—Reidlaw, L.L.C.; John S. Reid

(57) ABSTRACT

A force-transmitting device comprising an aluminum alloy shaft portion, a steel end portion, and a transition portion having a first portion of aluminum alloy and a second portion of steel which is bonded to the first portion at a bonded joint. The shaft portion is welded to the first portion and the end portion is welded to the second portion, forming an integral force-transmitting device. The device is configured to transmit a force between the shaft portion and the end portion by way of the bonded joint. A device constructed in accordance with the present from two different metals achieves weight savings over prior art single-metal devices, and is simpler to fabricate than prior art two-metal devices.

9 Claims, 4 Drawing Sheets

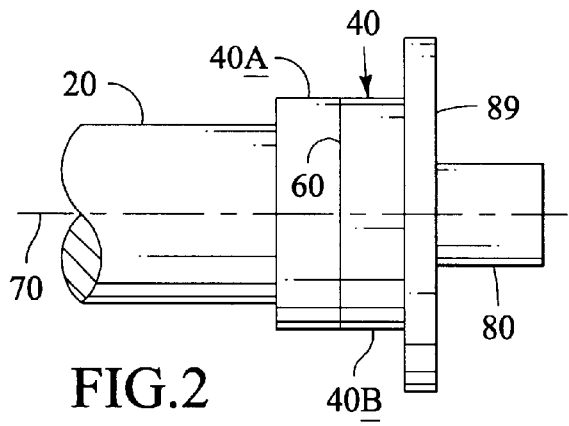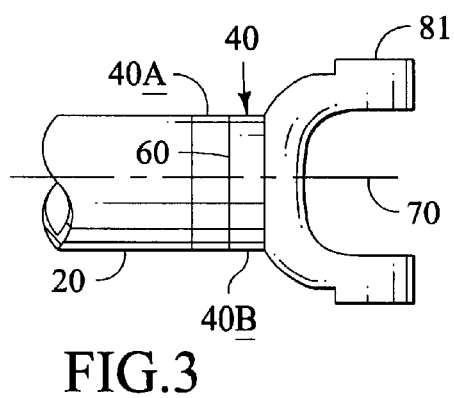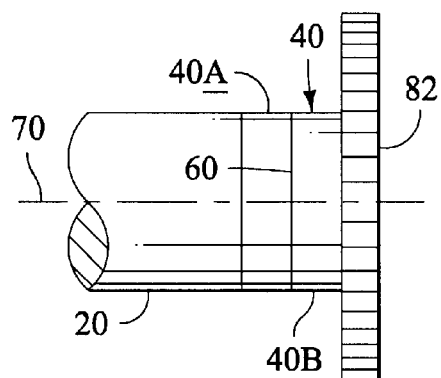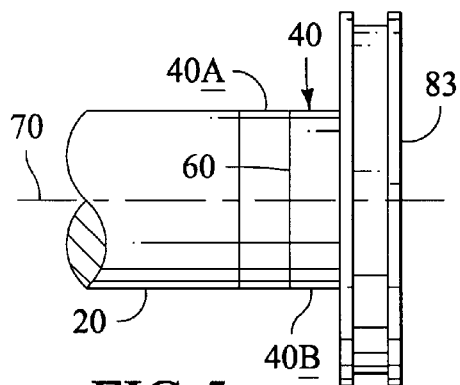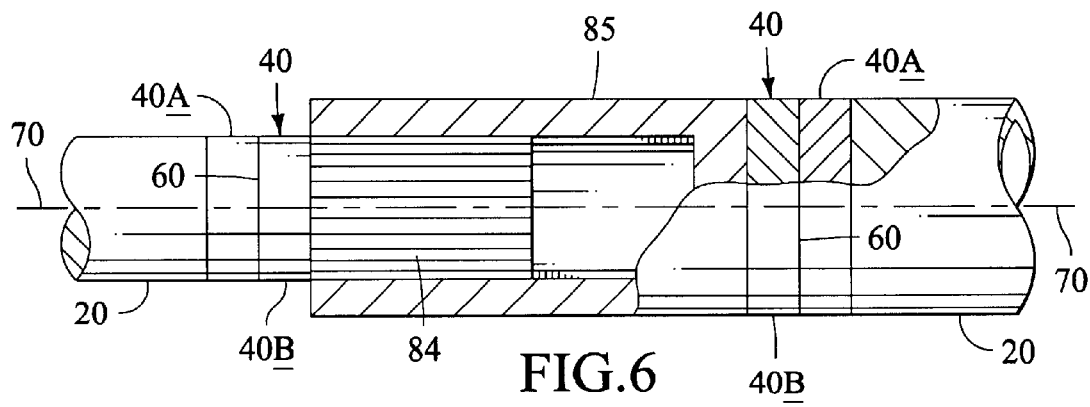

FORCE-TRANSMITTING DEVICE

FIELD OF THE INVENTION

The present invention relates to a force-transmitting device and more specifically to a torque transmitting shaft having a bonded joint between two dissimilar materials.

BACKGROUND OF THE INVENTION

In general, force-transmitting devices are used to transmit a force from a mechanical power source to a driven member. An example of a typical driven member can be, among others, a drill bit, a saw blade, a pump, or an automotive road wheel. An example of a typical power source can be, among others, an electric motor or an internal combustion engine.

Typically, an engine or motor produces mechanical power in the form of a rotational or torsional force. In such a case, the force-transmitting device used to transmit the rotational force is usually in the form of a shaft which rotates about a longitudinal rotational axis as it transmits the power between the engine or motor and the driven member.

In an automotive environment, for example, the power source is usually in the form of a gasoline or diesel engine which is mounted on an automotive vehicle. In such a case, the driven member is one or more driven road wheels that are attached to the vehicle. At least one force-transmitting device is usually used to transmit the rotational power produced by the engine to the driven road wheel, or wheels, for the purpose of propelling the vehicle. The engine and the driven road wheels, together the force-transmitting device and associated components, are usually referred to as the "drive train" of the vehicle. Two common examples of force-transmitting devices that are included in vehicle drive trains are those of drive shafts and axle shafts.

Generally, a rotating shaft type of force-transmitting device, such as that used in an automotive drive train, has a central shaft portion and a coupling portion mounted on each of the two ends of the shaft portion. The coupling portions are usually configured to facilitate the coupling of the force-transmitting member into force-transmitting relation with other components of the drive train. The shaft portion is usually configured to efficiently transmit rotational power between the two coupling portions.

The coupling portions can each have a number of different configurations depending on the specific application of the force-transmitting device. For example, in an automotive environment, a coupling portion can be configured, among others, as a component of: a universal joint, a constant velocity joint, a mounting plate, a spline, a gear, and a road wheel mounting hub.

Likewise, the shaft portion can have a number of different configurations depending on the specific application. The most common configurations of the shaft portion are those of a hollow tube, and that of a solid bar. As such, the tube or bar may have any number of different shapes, but the most prevalent shape is that of an elongated circular cylinder.

One consideration in the overall configuration of a force-transmitting device is the weight, or mass, of the device. The overall mass of a force-transmitting device can be an important consideration in some applications. For example, the mass of a force-transmitting device can effect the fuel efficiency of the automotive vehicle in which the device is installed. A force-transmitting device can effect the fuel efficiency of a vehicle from both a gravitational standpoint and an inertial standpoint.

From a gravitational standpoint, the more mass a vehicle has, the more energy the vehicle engine must produce to overcome gravitational forces. For example, a vehicle made of heavier material will result in more rolling resistance at the tire/road surface contact point than a similar vehicle which is made from material that weighs less. Similarly, a vehicle made from relatively heavy material will require more energy to propel the vehicle up a hill than a vehicle made from relatively light material.

From an inertial standpoint, generally, a vehicle made of heavier material will require more energy to accelerate at a given rate than a vehicle made of relatively light material. Similarly, a rotating component of an automobile drive train, such as a force-transmitting device which is made from a relatively heavy material will require more energy to rotationally accelerate at a given rate than a similar component of lighter material. Further, by reducing rotational mass, a rotating shaft can be accelerated or slowed more rapidly than a heavier shaft. This can be beneficial for example in performance automobiles where it is desirable to accelerate or decelerate a rotating shaft, for example, when changing speeds when entering a corner.

There are also other instances in which the weight of the material used in making a force transmitting device is an important consideration. For example, another application of a force transmitting device is that of drill string, or drill rod, used in geological drilling or boring operations. In certain instances, drill string sections must be transported long distances to and from the drilling site, and can even be transported by helicopter. The use of a relatively lighter material in the manufacture of drill string sections would thus result in lower costs associated with transporting such drill string.

Several different types of materials are available for the manufacture of force-transmitting devices. Two popular materials are those of steel and aluminum alloy. Steel has several attributes as a material for force-transmitting devices. One such attribute is that it is relatively inexpensive. Another attribute of steel is its durability. For example, some types of steel can be treated to obtain a high level of hardness relative to other materials. High hardness can be very desirable in certain applications such as, for example, components that are subjected to concentrated stress loads and components subjected to surface-to-surface contact with other components.

However, one of the drawbacks of using steel as a material for force-transmitting devices is that steel has a relatively low strength-to-weight ratio when compared with other suitable materials such as, for example, aluminum alloy. In other words, steel has more mass than other materials at a given strength level. For example, consider two versions of an automobile drive train component such as, for example, a drive shaft. Furthermore, consider the case in which one of the drive shafts is made from steel and the other is made from an aluminum alloy and that both drive shafts have the same force-transmitting capacity. In such a case, the aluminum alloy drive shaft will weigh about half that of the steel drive shaft. Thus, a chief attribute of using aluminum alloy as a material for force-transmitting devices is that aluminum has a relatively high strength-to-weight ratio compared with steel. On the other hand, however, the surface hardness of steel generally is not attainable in aluminum alloy material.

As described above, the use of aluminum alloy as a material for force-transmitting devices would be desirable in cases where weight savings would be beneficial. At the same time, however, the use of aluminum alloy would not be desirable in cases where a high level of hardness is desired or required in the device. Thus, combining aluminum alloy portions with steel portions to produce a "hybrid" force-transmitting device would result in maximum benefits compared with similar devices made entirely from either one or the other material.

Producing such a hybrid force-transmitting device of both aluminum alloy and steel portions, however, would require joining steel and aluminum alloy together. The traditional method of joining steel and aluminum alloy has been that of welding, bolting. Although welding has long been successfully used to join two similar or identical materials, the process of welding dissimilar metals, such as aluminum alloy and steel, has not been perfected to a desirable degree. Specifically, the strength of an aluminum to steel weld is generally relatively low and the result is an unacceptably high rate of weld failure. When dissimilar metals are joined by bolting, the process is time consuming and requires additional parts. In modern assembly processes, such as building of automobiles, it is desirable to reduce the time of assembly as well as the number of components required in the final assembled product.

Therefore, it would be desirable to provide a force-transmitting device which achieves the benefits to be derived from similar prior art devices, but which avoids the shortcomings and detriments individually associated therewith. Specifically, it is desirable to produce an assembly of two metals, one heavier than the other, which will achieve weight savings in the final assembly, and will also reduce the time and cost of joining the two metals.

SUMMARY OF THE INVENTION

The present invention provides for a force-transmitting device comprising a first portion of aluminum alloy, and a second portion of steel which is bonded to the first portion at a bonded joint. The device also comprises an aluminum alloy shaft welded to the first portion and a steel end portion welded to the second portion. The device is configured to rotate about an axis while transmitting mechanical power between a power source and a driven member. In the transmitting of mechanical power, torsional force is transmitted through the bonded joint, between the shaft portion and the end portion.

An apparatus or component constructed in accordance with the present invention achieves weight savings over prior art single metal components. Further, an apparatus or component constructed in accordance with the present invention achieves assembly time and reduces the number of components required for assembly over prior art two-metal components.

BRIEF DESCRIPTION OF THE DRAWINGS

Preferred embodiments of the invention are described below with reference to the following accompanying drawings.

FIG. 2 is a partial side view of a second embodiment of a device in accordance with the present invention.

FIG. 3 is a partial side view of a third embodiment of a device in accordance with the present invention.

FIG. 4 is a partial side view of a fourth embodiment of a device in accordance with the present invention.

FIG. 5 is a partial side view of a fifth embodiment of a device in accordance with the present invention.

FIG. 6 is a partial side view of a sixth embodiment of a device in accordance with the present invention.

DETAILED DESCRIPTION OF THE PREFERRED EMBODIMENTS

The invention generally includes a force-transmitting device comprising a first portion of aluminum alloy and a second portion of steel which is bonded to the first portion at a bonded joint. The device also comprises an aluminum alloy shaft welded to the first portion and a steel end portion welded to the second portion. The device is configured to transmit a torsional force between the shaft portion and the end portion by way of the bonded joint.

Figure 1:
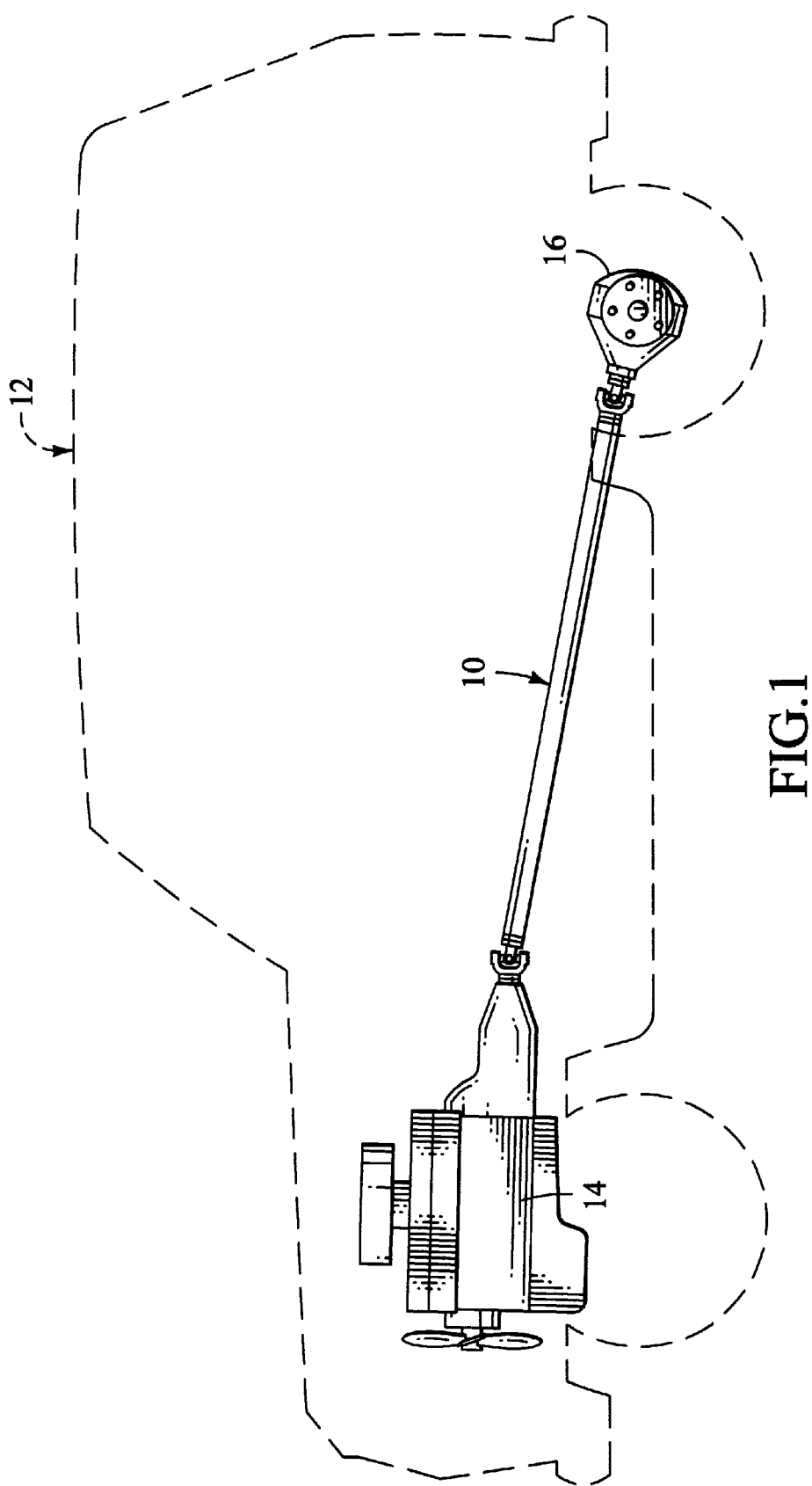
FIG. 1 is an environmental view of a first embodiment of a device in accordance with the present invention.

A device in accordance with the present invention is shown in FIG. 1, and is generally indicated by the numeral 10. In one embodiment of the device in accordance with the present invention, the device 10 is installed in an automotive vehicle 12 as shown in FIG. 1. The device 10 is generally configured to transmit a force between a power source such as, for example, an automotive engine 14, and a driven member such as, for example, an automotive drive axle 16.

Figure 9:
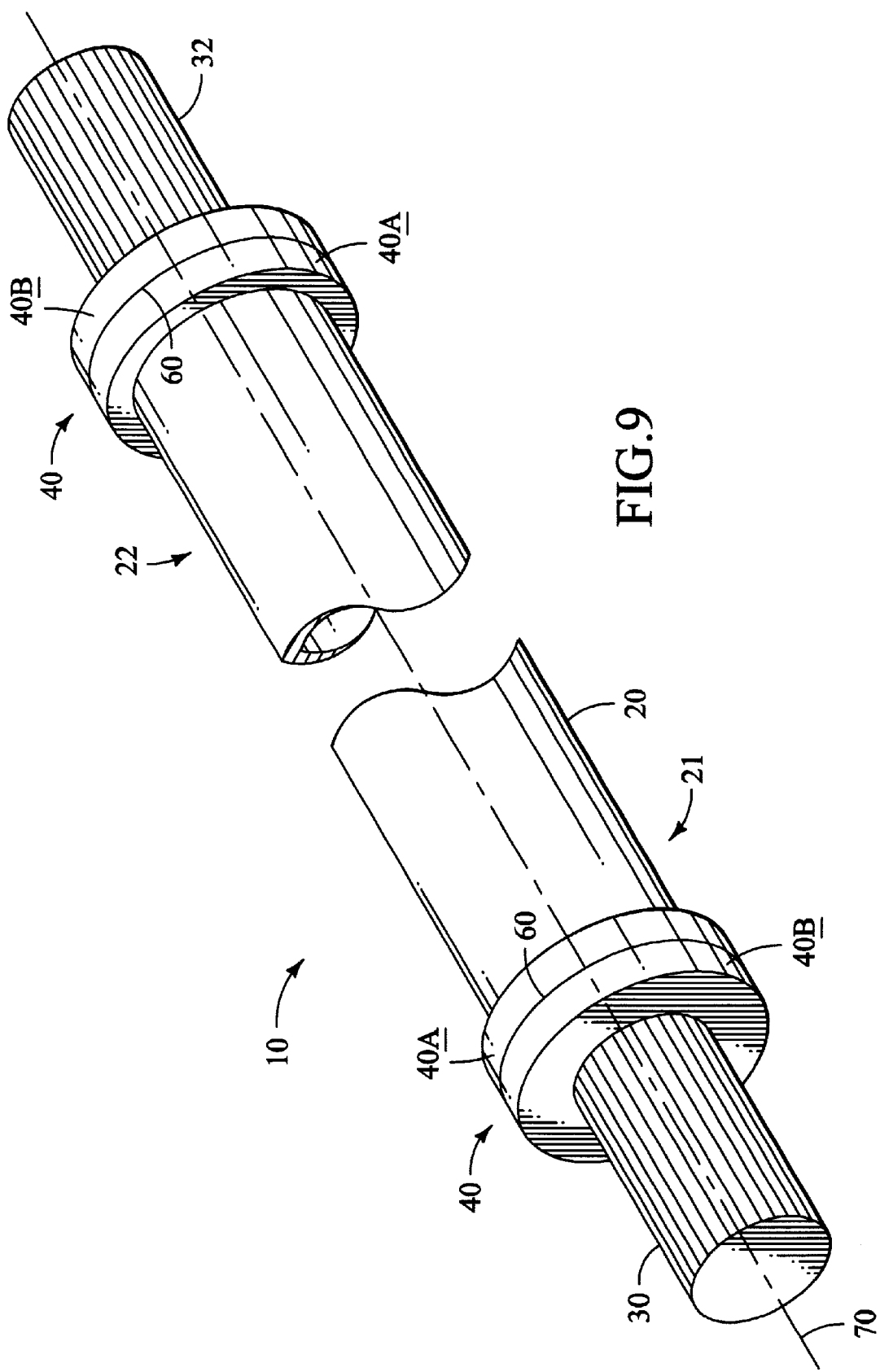
FIG. 9 is a perspective view of the embodiment of the invention depicated in FIG. 1.

Referring to FIG. 9, the device 10 generally comprises a central shaft portion 20 which is constructed from a first material which can be metal such as, for example, aluminum alloy. The shaft portion 20 has a first end 21 and an opposite second end 22. The shaft portion 20 can generally be in the form of an elongated bar or tube. The shaft 20 can have any number of different shapes, but generally that of a circular cylinder is preferable. More preferably, the shaft portion 20 comprises a hollow shaft to reduce weight and rotational inertia.

As further shown in FIG. 9, the device 10 has at least one end portion 30 located proximate to the first end 21 of the shaft portion 20. The device 10 can have a second end portion 32 which is located proximate to the second end 22 of the shaft portion 20. The end portions 30, 32 are constructed from a second material which is different from the first material. The second material can be metal such as, for example, steel.

Still referring to FIG. 9, the device 10 also comprises a transition portion 40 connected to, and located between, the shaft portion 20 and each end portion 30, 32 as shown. The transition portion 40 is made up of a first portion 40A and a second portion 40B. The first transition portion 40A is constructed from the first material, which is the same material from which the shaft portion 20 is constructed. The second transition portion 40B is constructed from the second material, which is the same material from which the end portions 30, 32 are constructed. Thus, if the shaft portion is constructed from aluminum alloy, then the first transition portion 40A is also constructed of aluminum alloy. Likewise, if the end portions 30, 32 are constructed from steel, then the second transition portion is also constructed from steel. Each of the first and second transition portions, 40A and 40B can be substantially in the form of a flat plate preferably having a thickness of at least about 0.5 centimeters. In constructing the device 10, the shaft portion 20 is generally welded to the first transition portion 40A and the end portions 30, 32 are generally welded to the respective second transition portions 40B, forming an integral unit which makes up the device 10.

Now referring to FIG. 9, the transition portion 40, which comprises the first portion 40A and the second portion 40B is usually cut from a section of bonded material. The bonded material can be made of a first layer of aluminum alloy which has been bonded to a second layer of steel. The bonded material is preferably formed by a process known in the art as roll-bonding, although other less preferable bonding techniques, such as explosion bonding, can also be employed. Typically, two plates of dissimilar metal are bonded together. Specific fabrication pieces can then be cut from the bonded plate. The fabrication pieces can then be used as is, or they can be further worked into different shapes, for example by bending or rolling. A bonded joint, such as joint 60 of FIG. 9, formed by the roll-bonding process preferably has a yield strength at least as great as the yield of the aluminum alloy first layer. Clad or bonded metals of the type preferably intended for use in the present invention can be obtained, for example, from Spur Industries, Inc. of Spokane, Wash.

Generally, after the transition portion 40 is cut from bonded material, the transition portion is welded in place between the shaft portion 20 and the respective end portion 30, 32 as discussed above. That is, the aluminum alloy first portion 40A is welded to the aluminum alloy shaft portion 20, and each steel second portion 40B is welded to the respective steel end portion 30, 32. During the process of welding the shaft portion 20 and the end portions 30, 32 to the first and second portions 40A, 40B, respectively, the temperature of the first and second portions at the bonded joint 60 should not exceed that of about 200° Centigrade. This maximum temperature is to prevent damage to the bonded joint 60.

Preferably, the thickness of each metal at the transition piece 40 is at least 1 cm. and more preferably is at least about 2.0 cm in thickness. The use of thicker metals at the transition piece allows for the temperature to be more accurately controlled at the metal-to-metal junction, which advantageously helps to insure the integrity of the bond between the two metals.

Now referring back to FIG. 1, in one embodiment, the device 10 can be configured to transmit mechanical power between a power source such as, for example, an automotive engine 14, and a driven member such as, for example, an automotive drive axle 16. In such an embodiment, the device 10 can be configured to be used as the drive shaft of a rear-wheel drive type of automotive vehicle 12. In that case, the first end portion 30 of the device 10 is connected in force-transmitting relation to the output of the automotive engine 14, and the second end portion 32 of the device is connected in force-transmitting relation to the drive axle 16. The automotive engine 14 applies torsional force to the first end portion 30 which causes the device 10 to rotate about the axis 70. As the device 10 rotates about the axis 70, the second end portion 32 is caused to rotate which, in turn, causes the drive axle 16 to rotate. Thus, the torsional force produced by the automotive engine 14 is transmitted from the first end portion 30 to the second end portion 32 as the device 10 rotates about the axis 70.

Further study of FIGS. 1 and 9 will reveal that, during the transmission of the torsional force between the first and second end portions 30, 32, the torsional force is transmitted from the first end portion to the shaft portion 20 by way of the bonded joint 60 which is located there between. Similarly, the torsional force is transmitted from the shaft portion 20 to the second end portion 32 by way of the other bonded joint 60 which is located there between. It can also be seen in FIG. 9 that the axis 70 is substantially normal to each of the bonded joints 60. Thus, in such a configuration as is shown in FIG. 9, each of the bonded joints 60 is subjected to shear stress during transmission of the torsional force by the device 10. In an alternative embodiment of the present invention which is not shown, the device 10 can be configured so that the axis 70 is substantially parallel to the bonded joint 60. Moreover, in yet another alternative embodiment of the present invention which is not shown, the device 10 can be configured so that the axis 70 is substantially oblique to the bonded joint 60.

Now referring to FIGS. 2–6, the end portions 30, 32 can be configured in any of a number of different manners to facilitate coupling the device 10 between a power source and a driven member. For example, in one embodiment the end portion 30 or 32 can be a flange 89 with a pilot shaft 80 as shown in FIG. 2. In another embodiment of the device 10 shown in FIG. 3, the end portions 80, 81 can be configured as a component of a universal joint. In yet a third embodiment, the end portion can be configured as a gear 82 as shown in FIG. 4. An alternative embodiment shown in FIG. 5 employs a pulley 83 for the end connection. A further embodiment is shown in FIG. 6 wherein the end connection is a male spline gear 84. As further shown in FIG. 6, the end connection can be configured as a female spline gear 85 in a different embodiment. It is understood that the end portions shown in FIGS. 2–6 are exemplary only and that other end connection configurations are possible.

Figure 7:
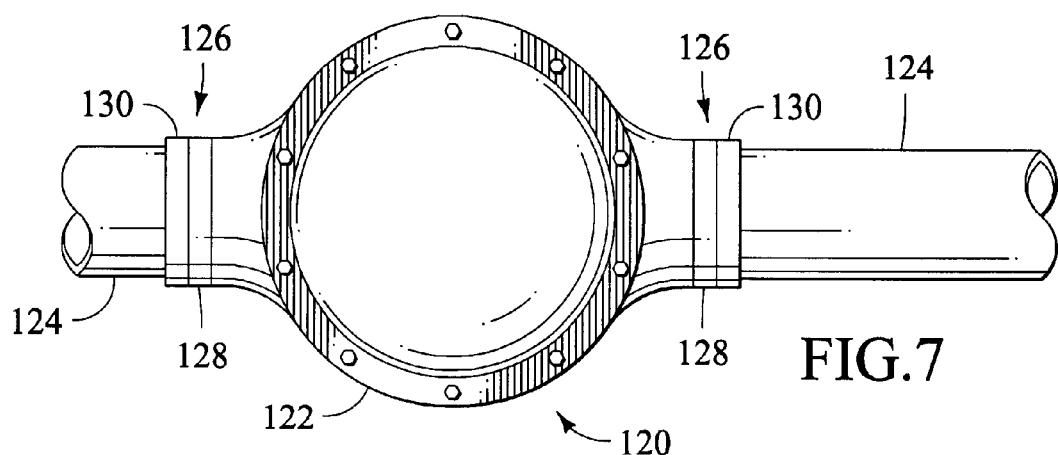
FIG. 7 is a partial side view of a seventh embodiment of a device in accordance with the present invention.

In one variation shown in FIG. 7, a device in accordance with the present invention can include a drive axle assembly 120. The assembly 120 comprises a differential housing 122 and axle housings 124. The differential housing 122 can be cast from a relatively light material such as, for example, aluminum to conserve weight in a vehicle in which the assembly 120 is installed. Typically, the axle housings 124 are bolted to the suspension system of a truck or the like. The axle housings 124 can be made of another material such as, for example, steel, which exhibits high durability needed for such an application as shown. Transition portions 126 are located between the axle housings 124 and the differential housing 122. The transition portions 126 are each comprised of a first portion 128 and a second portion 130 which is bonded to the first portion 128 by roll-bonding as described herein above. The transition portions 126 can be fabricated from a section of bonded material. The first portion 128 is made of the same material as the differential housing 122 such as, for example, aluminum. The first portion is welded to the differential housing 122 as also described above. Likewise, axle housings 126 are of the same material as the second transition portion 130 such as, for example, steel. All welding is preferably perform in accordance with the methods described herein above for controlling the temperature of the first and second portions 128, 130.

Figure 8:
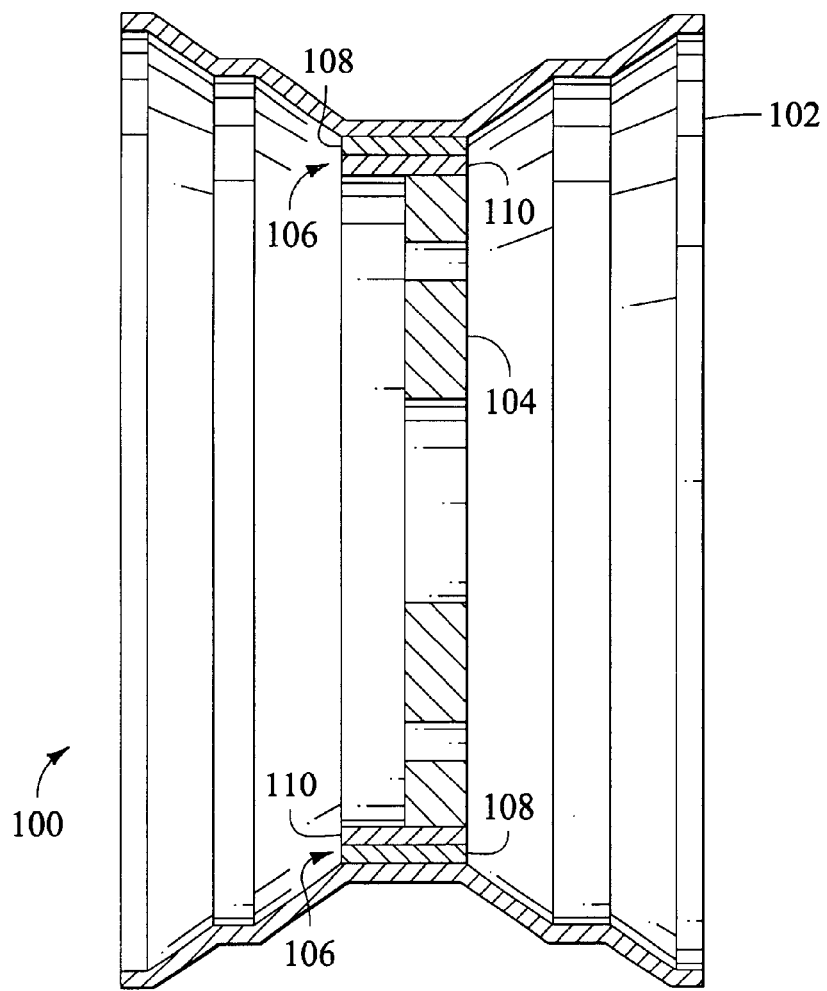
FIG. 8 is a partial side view of an eight embodiment of a device in accordance with the present invention.

Turning now to FIG. 8, an alternative embodiment of the invention is shown. In FIG. 8, the device comprises a wheel 100. The wheel has an outer rim 102 which is configured to accept a tire. The wheel further includes an inner mounting flange 104 which is configured to be mounted to a wheel hub of a vehicle or the like. Connecting the flange 104 to the outer rim is a transition portion 106. The rim 102 can be made of a metal such as aluminum to reduce weight and rotational inertial. The flange 104 can be made of a metal such as steel which has a high strength and which can bear the loads exerted on the wheel by the driving member. The transition portion 106 comprises an outer ring 108 which is of the same material as the rim 102 such as, for example, aluminum. The transition portion 106 further comprises an inner ring 110 which is of the same material as the flange 104 such as, for example, steel. The transition portion 106 is formed by roll-bonding as described herein above. After forming the bonded material, the transition portion 106 can be fabricated by rolling a strip of the bonded material into the shape of a ring as shown in FIG. 8. The transition portion 106 can be welded in place between the rim 102 and the flange 104 as shown in FIG. 8. All welding is preferably perform in accordance with the methods described herein above for controlling the temperature of the first and second portions 128, 130.

The diameter of the shaft portion 20, and the thickness of the material or the shaft portion, are selected according to the anticipated torque to be transmitted by the shaft portion. Likewise, the dimensions of the end portions 30, 32 are selected to accommodate the anticipated loads to be bourne by the force transmitting device. Further, the area of contact between the two materials at the transition portions 40 is selected to bear the anticipated load, and in particular, the torque applied to the dissimilar material junction. A properly bonded junction should ideally bear more load than the weaker of the two metals in an equivalently dimensioned configuration. Therefore, if the metal-to-metal junction comprises at least the cross sectional area of the less strong of the two metals when equally dimensioned (i.e., outside diameter and thickness), then the junction should be sufficient to bear the load which the weaker of the two metals can bear.

The invention further includes a method of fabricating a force transmitting component from two dissimilar metals. The component has a first portion configured to be connected to a force source, such as a motor or an engine. The component also has a second portion for transmitting force from the first portion. The force can be transmitted for example to a wheel or the like. The first portion is fabricated from a first metal, while the second portion is fabricated from a second metal. For example, the first metal can be steel, and the second metal can be aluminum.

The method includes the first step of providing a bonded joint portion. The bonded joint portion has a first side fabricated from the first metal, and a second side fabricated from the second metal. The two sides are joined at a bond joint, which is preferably achieved by roll bonding the first and second sides of the bonded joint together. The first side of the bonded joint portion is welded to the first portion, and the second side of the bonded joint portion is welded to the second portion. The welding is preferably performed in a manner to keep the temperature at the bonded joint at or below a temperature at which the bonded joint can become unstable. More preferably, the temperature at the bonded joint is maintained at or below 200 degrees Centigrade during the welding process. This can be achieved by increasing the distance between the bonded joint and the weld, which in turn can be achieved by using a relatively thick metal for first and second sides of the bonded joint portion. In this manner, an integral component fabricated from two dissimilar metals is produced, which requires relatively little labor to assemble.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A force-transmitting device comprising:
   a transition portion comprising a first portion which is fabricated from a first material and which is in the form of a substantially flat plate, and a second portion which is fabricated from a second material and which is in the form of a substantially flat plate, wherein the first portion and the second portion are bonded to one another at a bonded joint which is formed by roll-bonding, and wherein the device is configured to transmit mechanical power between the first and second portions and through the bonded joint;
   a shaft which is fabricated substantially from the first material and which is welded to the first portion; and,
   an end portion which is fabricated substantially from the second material and which is welded to the second portion.

2. The force-transmitting device of claim 1, and wherein the end portion is at least a portion of a universal joint.

3. The force-transmitting device of claim 1, and wherein the end portion is at least a portion of a spline.

4. The force-transmitting device of claim 1, and wherein the end portion is at least a portion of a pulley.

5. The force-transmitting device of claim 1, and wherein the end portion is at least a portion of a gear.

6. A force-transmitting device, comprising:
   a pair of transition portions, wherein each transition portion comprises a first portion which is fabricated from a material comprising aluminum, and a second portion which is fabricated from a material comprising steel, and wherein each first portion is bonded to a respective second portion at a bonded joint by roll-bonding;
   an elongated shaft connected between the pair of transition portions, wherein the shaft has a first end defined thereon and an opposite second end defined thereon, and wherein the shaft is fabricated from a material comprising aluminum, and wherein the first portion of one transition portion is welded to the first end of the shaft and the first portion of the other transition portion is welded to the second end of the shaft; and,
   a pair of end portions which are each fabricated from a material comprising steel, and wherein one of the end portions is welded to one of the second portions and the other of the end portions is welded to the other of the second portions.

7. The force-transmitting device of claim 6, and wherein the device is configured to transmit mechanical power between an automotive engine and an automotive drive axle.

8. The force-transmitting device of claim 6, and wherein each first portion and each second portion are in the form of substantially flat plates.

9. The force-transmitting device of claim 6, and wherein each of the end portions is at least a portion of a universal joint.

* * * * *